(12) United States Patent
Gupta et al.

(10) Patent No.: US 8,783,490 B2
(45) Date of Patent: Jul. 22, 2014

(54) COMPOSITE MICROWAVE AND OVEN SAFE FOOD CONTAINER SYSTEM

(75) Inventors: Juhi Gupta, Eden Prairie, MN (US); Steve Campbell, Lakeville, MN (US)

(73) Assignee: Zuna Enterprises, LLC, Eden Prairie, MN (US)

( * ) Notice: Subject to any disclaimer, the term of this patent is extended or adjusted under 35 U.S.C. 154(b) by 299 days.

(21) Appl. No.: 13/093,709

(22) Filed: Apr. 25, 2011

(65) Prior Publication Data

US 2011/0259777 A1 Oct. 27, 2011

Related U.S. Application Data

(60) Provisional application No. 61/327,359, filed on Apr. 23, 2010, provisional application No. 61/386,322, filed on Sep. 24, 2010.

(51) Int. Cl.
*B65D 81/02* (2006.01)

(52) U.S. Cl.
USPC .................. 220/23.87; 220/573.4; 220/23.89

(58) Field of Classification Search
USPC ............ 220/23.89, 23.87, 23.91, 574.3, 574, 220/573.4, 573.5, 573.1, 4.26, 4.27, 506; 206/521
See application file for complete search history.

(56) References Cited

U.S. PATENT DOCUMENTS

| | | | | |
|---|---|---|---|---|
| 2,332,173 A * | 10/1943 | Shaffer | | 220/574.2 |
| 2,828,043 A * | 3/1958 | Hosford, Jr. | | 220/592.22 |
| 4,439,656 A * | 3/1984 | Peleg | | 219/731 |
| 4,663,506 A * | 5/1987 | Bowen et al. | | 219/730 |
| 4,746,017 A * | 5/1988 | Howard et al. | | 206/438 |
| 4,756,446 A * | 7/1988 | Gen et al. | | 206/457 |
| 4,847,459 A * | 7/1989 | Desai | | 219/735 |
| 5,266,763 A * | 11/1993 | Colombo | | 219/734 |
| 6,152,319 A * | 11/2000 | Kamachi et al. | | 220/592.2 |
| 6,253,918 B1 * | 7/2001 | Greiner | | 206/457 |
| 6,325,211 B1 * | 12/2001 | Greiner | | 206/457 |
| 6,786,334 B2 * | 9/2004 | Smith | | 206/592 |
| 6,793,076 B1 * | 9/2004 | Luo et al. | | 206/521 |
| 7,131,289 B2 * | 11/2006 | Harl et al. | | 62/457.2 |
| 7,784,638 B2 * | 8/2010 | Kishbaugh et al. | | 220/573.3 |
| 7,921,992 B2 * | 4/2011 | LaRue et al. | | 206/204 |
| 8,080,295 B2 * | 12/2011 | Kitzmiller | | 428/35.7 |
| 8,100,285 B2 * | 1/2012 | Aseff | | 220/573.1 |
| 2002/0096528 A1 * | 7/2002 | Fernandez | | 220/574 |
| 2002/0104846 A1 * | 8/2002 | Rosenfeld | | 220/781 |
| 2003/0150238 A1 * | 8/2003 | Dais et al. | | 62/457.6 |
| 2003/0183543 A1 * | 10/2003 | Sheffield et al. | | 206/315.9 |
| 2005/0029259 A1 * | 2/2005 | Famham | | 220/4.27 |
| 2007/0095843 A1 * | 5/2007 | Wu | | 220/628 |
| 2008/0041850 A1 * | 2/2008 | Tucker et al. | | 220/212 |

(Continued)

OTHER PUBLICATIONS

Brinware catalogue, available at www.brinware.com, retrieved on Sep. 9, 2013.

*Primary Examiner* — Steven A. Reynolds
(74) *Attorney, Agent, or Firm* — Faegre Baker Daniels LLP

(57) ABSTRACT

A composite food storage container combines the advantages of glass and polymer while avoiding their disadvantages. A composite food storage container may include an outer polymer container that is configured to accommodate a glass container within the polymer container. Since the food does not contact the polymer, there are no potential concerns with chemicals leeching into the food. Since the glass is surrounded by the polymer container, the glass is protected from breakage and the composite food storage container does not become too hot to easily and safely handle upon removal from a microwave oven.

23 Claims, 21 Drawing Sheets

(56) References Cited

U.S. PATENT DOCUMENTS

| | | | |
|---|---|---|---|
| 2009/0057318 A1* | 3/2009 | Aseff | 220/573.1 |
| 2009/0321455 A1* | 12/2009 | Fernandez et al. | 220/574 |
| 2010/0006579 A1* | 1/2010 | Roth et al. | 220/592.01 |
| 2011/0139169 A1* | 6/2011 | Gerschman | 132/200 |
| 2011/0284554 A1* | 11/2011 | Ray et al. | 220/574.1 |
| 2012/0061404 A1* | 3/2012 | Roth et al. | 220/592.01 |

\* cited by examiner

COMPOSITE MICROWAVE AND OVEN SAFE FOOD CONTAINER SYSTEM

CROSS-REFERENCE TO RELATED APPLICATIONS

This application claims the benefit of U.S. Provisional Patent Application Ser. No. 61/327,359, filed on Apr. 23, 2010, and U.S. Provisional Patent Application Ser. No. 61/386,322, filed on Sep. 24, 2010, both of which are incorporated by reference herein in their entireties for all purposes.

TECHNICAL FIELD

The present invention pertains generally to storage containers and more particularly to food storage containers that are microwave and oven safe.

BACKGROUND

Many individuals are in the habit of bringing their own lunch to school and work by packing food in one or more food storage containers that are then carried in a paper, fabric or polymeric container. Some people, for example, simply use a disposable paper bag to carry their lunch. Some people have fabric bags or lunch boxes that they use to carry their lunch. The food storage containers may be plastic, metal or glass. Each of these materials have advantages and disadvantages.

Metal food storage containers are strong and not easily damaged, but they cannot be used in a microwave oven. Plastic food storage containers are resistant to damage and can be used in a microwave oven. However, some people are reluctant to use plastic in a microwave oven due to concerns over chemicals in the plastic potentially leeching into the food. Glass food storage containers can be used in a microwave oven, but glass is easily breakable. Glass containers can become too hot to easily handle.

SUMMARY

The present invention, according to various embodiments, relates to a composite food storage container that combines the advantages of glass and polymer while avoiding their disadvantages. In some embodiments, a composite food storage container may include an outer polymer container that is configured to accommodate a glass container within the polymer container. The polymer may be plastic, silicone, and/or another material. Since the food does not contact the polymer, there are no potential concerns with chemicals leeching into the food. Since the glass is surrounded by the polymer container, the glass is protected from breakage and the composite food storage container does not become too hot to easily and safely handle upon removal from the microwave oven.

In some embodiments, the polymer container may include shock-absorbing ribs that are disposed along an interior surface of the polymer container. The glass container may rest on the shock-absorbing ribs and thus be protected from damage. In some embodiments, the polymer container may include a non-slip lower surface. In some embodiments, the composite food storage container may include a lid that can be moved from closed to open in only a quarter turn. In some cases, the lid may make an audible noise such as a click when the lid reaches its closed position.

In some embodiments, the outer container and the lid have a substantially circular cross-sectional shape, and in other embodiments, the outer container and the lid have a substantially square or rectangular cross-sectional shape. According to some embodiments of the present invention, the lid sealingly engages with a top rim of the inner bowl, while according to other embodiments, the lid sealingly engages with an outer surface of the inner bowl. According to some embodiments of the present invention, the lid engages a top of the outer container, while according to other embodiments, the lid engages an outer surface of the outer container. According to some embodiments of the present invention, the outer container and the lid are both made of silicone.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
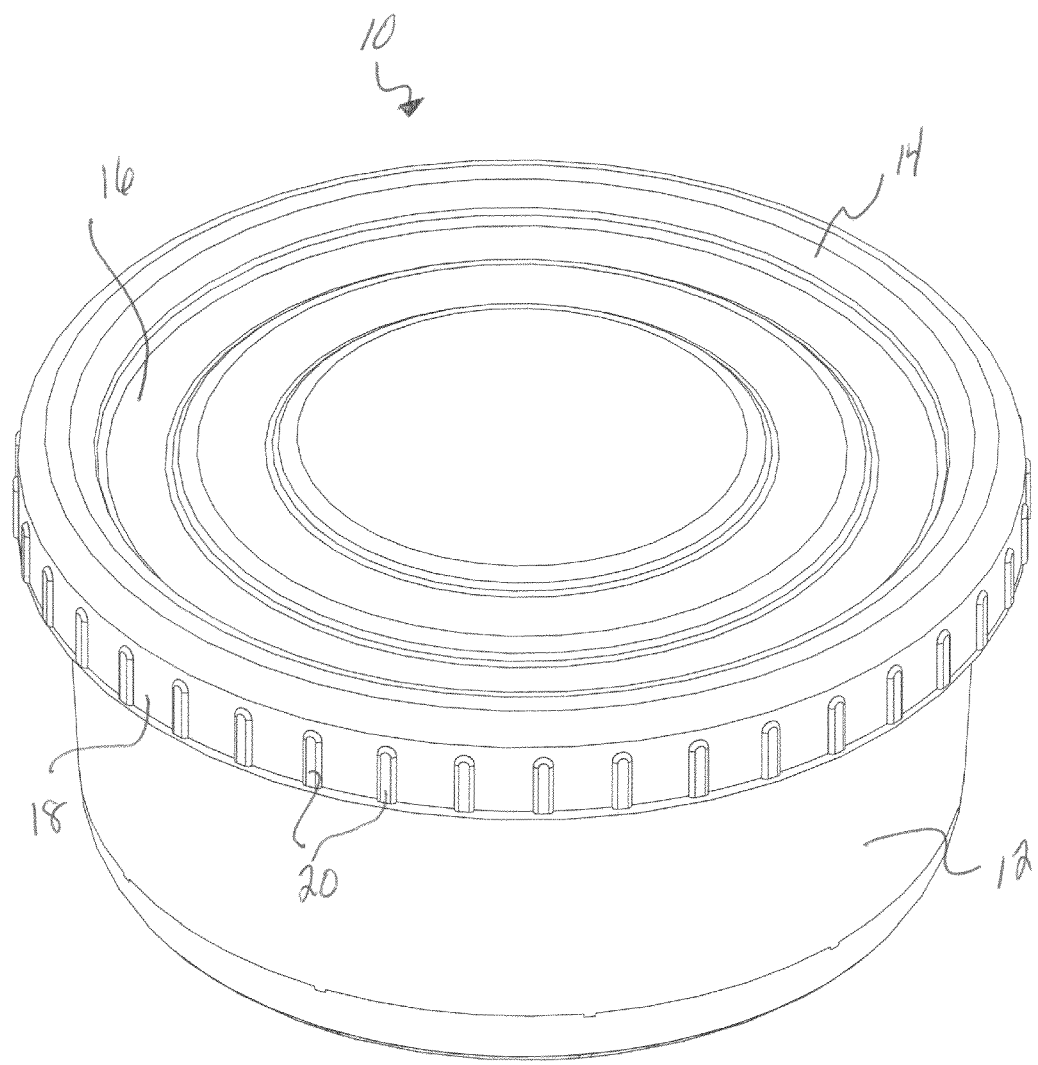
FIG. 1 is a perspective view of a composite food storage container in accordance with an embodiment of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The present invention, according to various embodiments, relates to a composite food storage container that includes an outer polymer container configured to accommodate a glass container within the polymer container. FIG. 1 is a perspective view of a composite food storage container 10 that includes an outer polymer container 12 and a cover 14. In some embodiments, the cover 14 includes an annular ring 16 that accommodates sealing structure on the opposite side of the cover 14 (not visible in this illustration) that seals against the inner glass container.

In some embodiments, the cover 14 has an outer annular ring 18 including a plurality of texture structures 20 that may make it easier for an individual to open and close the cover 14. The texture structures 20 may extend all the way around the outer annular ring 18. In some embodiments, the texture structures 20 may be formed as bumps or other-shaped protrusions extending away from the outer annular ring 18. In some embodiments, the texture structures 20 may be formed as depressions or low spots extending into the outer annular ring 18.

Figure 2:
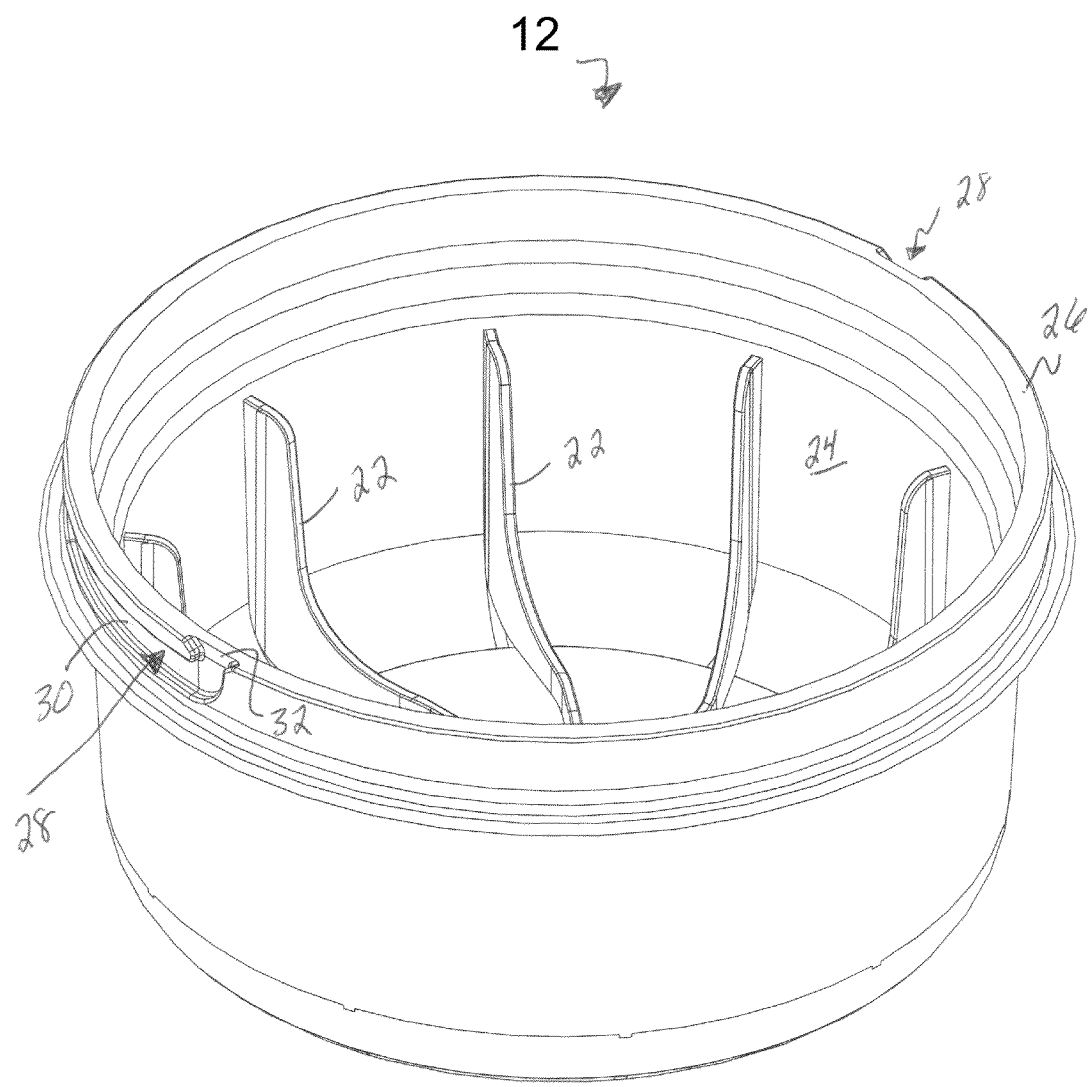
FIG. 2 is a perspective view of the composite food storage container of FIG. 1, with the cover and glass container removed to better illustrate the internal structure of the polymer container.
Figure 6:
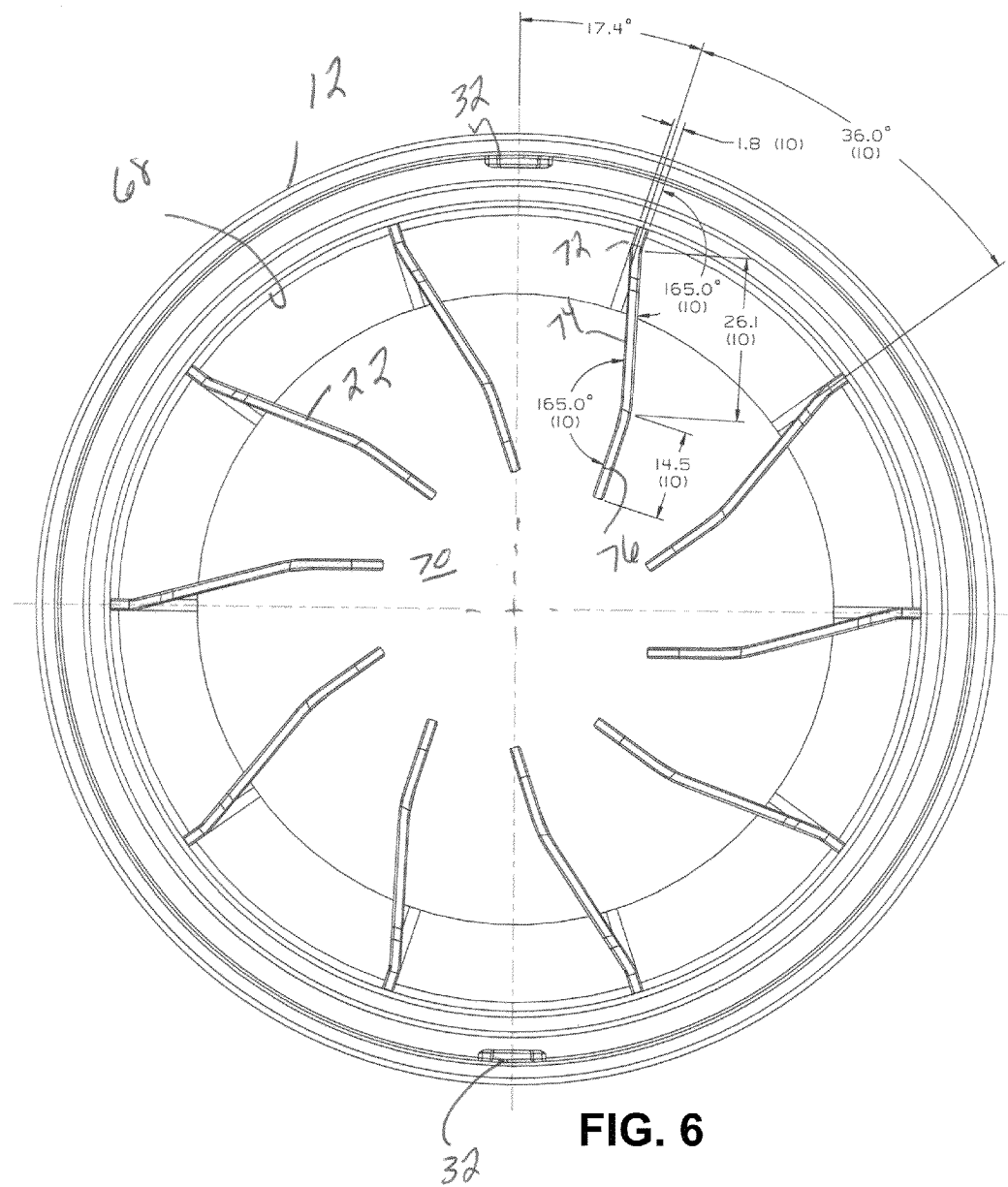
FIG. 6 is a top view of the polymer container forming part of the composite food storage container of FIG. 1.

FIG. 2 provides a glimpse at the interior of the polymer container 12, with the cover 14 removed. In the illustrated embodiment, a number of shock-absorbing ribs 22 are disposed on an inner surface 24 of the polymer container 12. In some embodiments, the polymer container 12 may include from three to about ten or more shock-absorbing ribs 22 radially spaced apart on the inner surface 24. In some embodiments, the shock-absorbing ribs 22 may be equally spaced apart. In some embodiments, the polymer container 12 may include ten shock-absorbing ribs 22 that are equally spaced about 36 degrees apart. In some embodiments, the shock-absorbing ribs 22 may be integrally molded as part of the polymer container 12. In some cases, the shock-absorbing ribs 22 may be formed separately and then subsequently adhesively secured to the inner surface 24. As illustrated in FIG. 6, the ribs 22 may extend from the inner surface of the bowl cover 12 in a rotationally symmetrical manner. According to some embodiments of the present invention, the ribs 22 extend from the inner surface of the bowl cover 12 in a manner exhibiting rotational symmetry of order ten; in other words, from the top view of FIG. 6, the bowl cover 12 may be rotated about the center through ten different positions and have the same visual appearance in each position. According to other embodiments of the present invention, the bowl cover 12 and ribs, as seen from the top view of FIG. 6, may include rotational symmetry of order four, five, six, seven, eight, nine, ten, eleven, or twelve.

The polymer container 12 includes an upper annular ring 26 that includes structure for releasably securing the cover 14 to the polymer container 12. In the illustrated embodiment, the upper annular ring 26 includes a pair of locking grooves 28 that are spaced about 180 degrees apart on the upper annular ring 26. In some embodiments, the upper annular ring 26 may include three or more equally spaced apart locking grooves 28. Each locking groove 28 includes, as best seen along the left side of FIG. 2, an elongate track 30 and an inlet 32. The cover 14 includes two or more corresponding locking pegs, as will be described with reference to FIG. 5. To attach the cover 14 to the polymer container 12, the cover 14 may be positioned over the polymer container 12 with the locking pegs aligned over the inlets 32. The cover 14 may be dropped onto the polymer container 12, with the pegs sliding into the inlets 32. To secure the cover 14 in place, the cover 14 may be rotated, with the pegs sliding into and along the elongate tracks 30.

Figure 3:
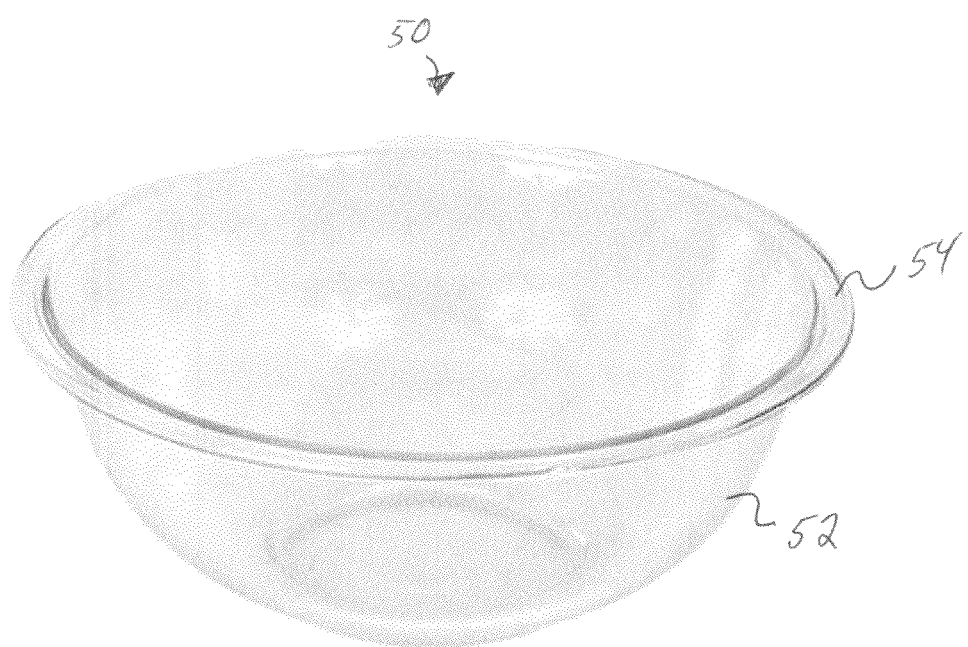
FIG. 3 is a perspective view of the glass container forming part of the composite food storage container of FIG. 1.

According to some embodiments, the shock-absorbing ribs 22 are configured to generally match the outer profile of the glass container. FIG. 3 is a perspective view of an illustrative but non-limiting glass container 50 that may be used as part of the composite food storage container 10. The glass container 50 includes a curved outer surface 52 that sits on the shock-absorbing ribs 22. The glass container 52 also includes an upper annular ring 54 that, as will be explained subsequently, cooperates with the aforementioned sealing structure on the underside of the cover 14. According to various embodiments, the dimensions and profile of the ribs are selected such that the glass container 50 fits snugly (i.e., fits with a slight interference fit), such that the glass container 50 is less likely to slip or fall out of the polymer container 12 during use.

In some embodiments, the glass container 50 may be removed from the polymer container 12 so that the glass container 50 may be washed (e.g., placed into a dishwasher). In some embodiments, an individual may have two or more glass containers 50 that may be swapped in and out of the polymer container 12. In this way, an individual may refrigerate or freeze leftovers or other food items in the glass container 50, and then transfer a particular glass container 50 (containing the desired food) into the polymer container 12 for taking for lunch that day. In some embodiments, the glass container 50 may be a Pyrex® glass bowl having a 2 cup capacity. In other embodiments, the composite food storage container 10 is sized to accommodate smaller or larger glass containers. While the glass container shown in FIG. 3 includes an outwardly protruding lip, according to other embodiments, the glass container or bowl does not include such a lip.

Figure 4:
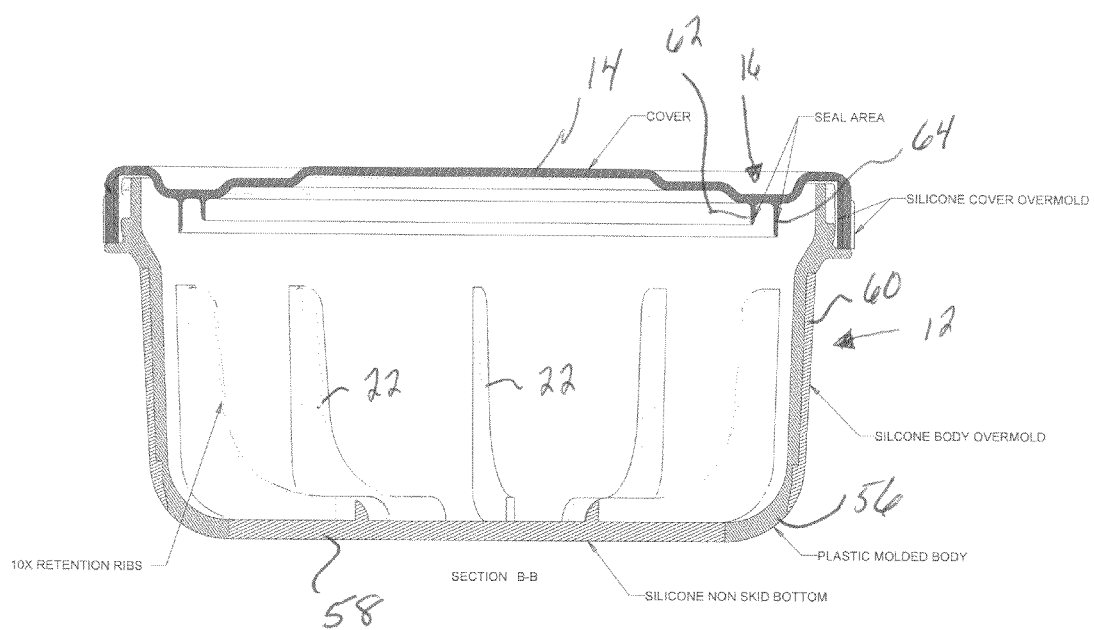
FIG. 4 is a cross-sectional view of the composite food storage container of FIG. 1, with the glass container removed for clarity.

FIG. 4 is a cross-sectional view of the composite food storage container 10, with the glass container 50 removed for clarity. FIG. 4 illustrates additional features of the polymer container 12 as well as the cover 14. In some embodiments, the polymer container 12 may be molded as one piece, and may be made of a single polymeric material. In the illustrated embodiment, the polymer container 12 may additional components molded therein to provide desired features such as making it easier to grip the composite food storage container 10.

In some embodiments, the polymer container 12 may include a polymer molded body 56 as well as a non-slip bottom 58 that can be secured about the bottom of the polymer molded body 56. In some embodiments, as illustrated, the non-slip bottom 58 may form the bottom of the polymer container 12. In some cases, the non-slip bottom 58 may extend at least partially into the shock-absorbing ribs 22. In some embodiments, the polymer container 12 may include a non-slip handling surface 60 that is molded over the polymer molded body 56.

In some embodiments, the non-slip bottom 58 and/or the non-slip handling surface 60 may be formed of any material that provides a good grip. In some embodiments, the non-slip bottom 58 and/or the non-slip handling surface 60 may be formed of silicone. The non-slip bottom 58 and/or the non-slip handling surface 60 may be molded onto the polymer molded body 56. In some embodiments, the non-slip bottom 58 and/or the non-slip handling surface 60 may be formed by spraying the polymer molded body 56. In various embodiments, portions of the container 12 are formed from silicone to allow the user to handle the container after heating the container (and its contents) in a microwave. The portions made from silicone will typically have a lower temperature, as silicone more effectively resists temperature increases when subjected to microwave energy.

In some embodiments, the cover 14 includes an inner sealing ring 62 and an outer sealing ring 64. The inner sealing ring 62 and the outer sealing ring 64 may be integrally formed with or otherwise attached to the annular ring 16 previously noted. In some embodiments, the inner sealing ring 62 and the outer sealing ring 64 may be configured to sealingly interact with the upper annular ring 54 of the glass container 50. In some embodiments, part or all of the cover 14 may be formed of a non-slip material such as silicone. For example, in some cases, the texture structures 20 (FIG. 1) may be formed of a non-slip material.

The polymer container 12 and the cover 14 may be formed of any suitable polymeric material. Illustrative but non-limiting polymeric materials include polyethylene such as HDPE (high density polyethylene) and LDPE (low density polyethylene), polypropylene, and PET (polyethylene teraphthalate). In some embodiments, the polymer container 12 and/or the cover 14 may independently be made of C-PET, polypropylene or polyethylene. In some embodiments, the polymer container 12 and/or the cover 14 may independently be made of silicone. In some embodiments, the polymer container 12 and/or the cover 14 may be injection molded. In some embodiments, the polymer container 12 and/or the cover 14 may include additional materials to impart desired colors or textures to the composite food storage container 10. In some embodiments, the composite food storage structure 10 may include designs and other artwork for the entertainment of the person using the composite food storage structure 10. In some embodiments, artwork may be silkscreened onto the polymer container 12 and/or the cover 14.

Figure 5:
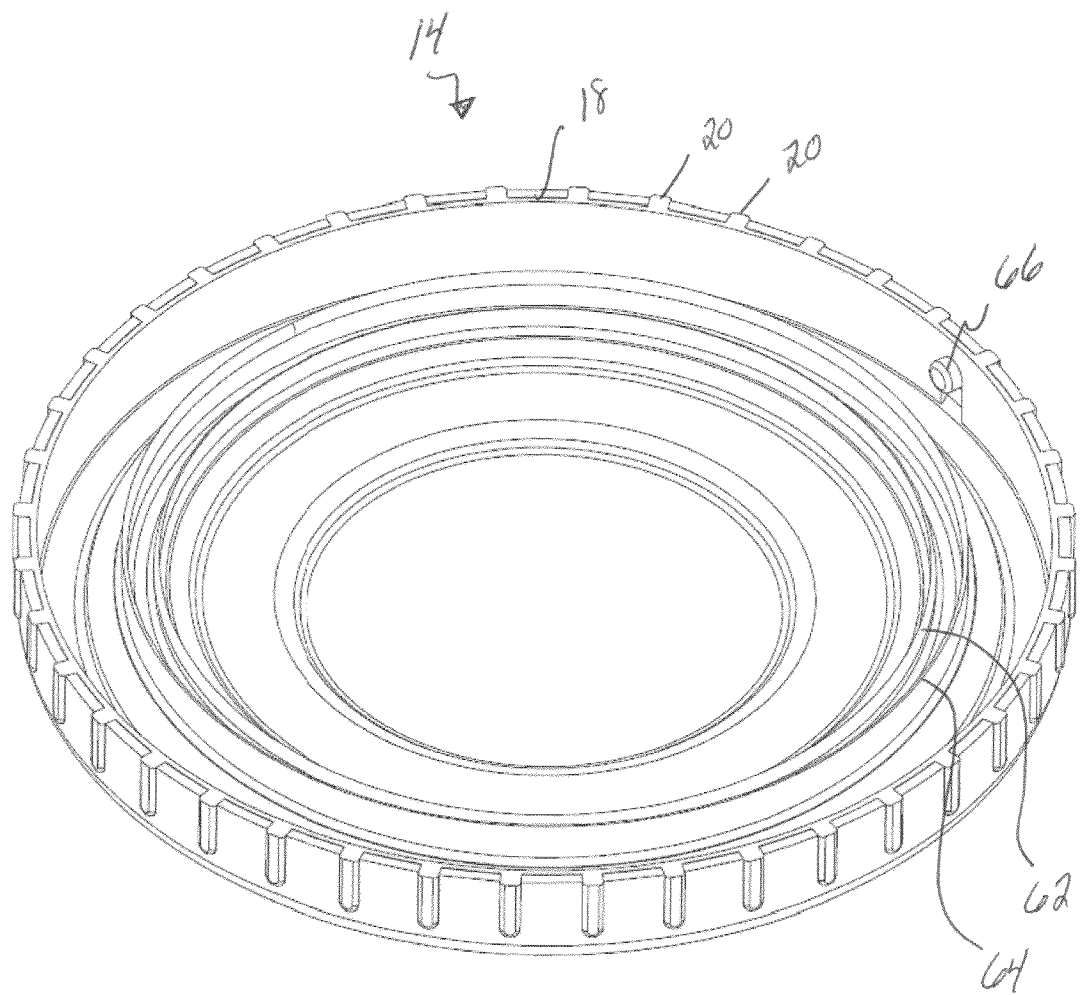
FIG. 5 is a perspective view of the underside of a cover forming part of the composite food storage container of FIG. 1.

FIG. 5 shows the underside of the cover 14, illustrating some of the structure previously discussed with reference to other Figures. The cover 14 includes two or more pegs 66, only one of which is visible in this illustration. In some embodiments, the cover 14 may include two pegs 66 that are spaced about 180 degrees apart. In some embodiments, the cover 14 may, for example, include three pegs 66 that are each spaced about 120 degrees apart, or perhaps four pegs 66 that are each spaced about 90 degrees apart. The number of pegs 66 and their relative alignment will correspond to the number and alignment of the locking grooves 28 formed in the upper annular ring 26 of the polymer container 12.

FIG. 6 provides an illustrative but non-limiting example of a possible configuration for the shock-resistant ribs 22. In this illustration, there are a total of ten shock-resistant ribs 22, each spaced about 36 degrees apart. The shock-resistant ribs 22 extend from an inner surface 68 and taper down to a lower surface 70. In some embodiments, the shock-resistant ribs 22 are radially aligned such that the tapered portions are directed towards a common point on the lower surface 70. In the illustrated embodiment, the shock-resistant ribs 22 are angled away from a common point.

In seen in FIG. 2 and FIG. 6, the shock-resistant ribs 22 include a first portion 72 located proximate the inner surface 68, a second portion 74 and a third portion 76. In some embodiments, as illustrated, the second portion 74 forms an angle of about 165 degrees with the first portion 74. In some embodiments, the third portion 78 forms an angle of about 165 degrees with the second portion 76. In some embodiments, the second portion 74 has a length of about 26.1 millimeters and the third portion 78 has a length of about 14.5 millimeters. In some embodiments, the shock-absorbing ribs 22 are about 1.8 millimeters thick.

Figure 7:
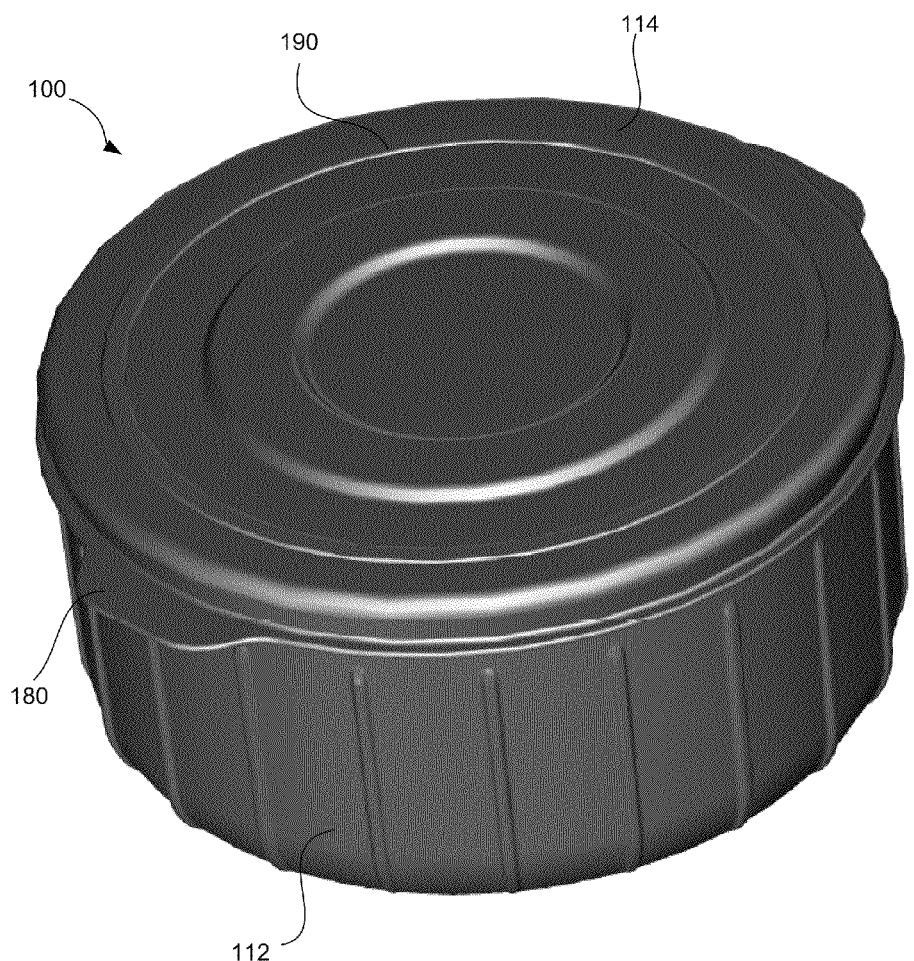
FIG. 7 is a front perspective view of a composite food storage container, according to embodiments of the present invention.
Figure 8:
FIG. 8 is a front perspective view of composite food storage container of FIG. 1, without the lid, according to embodiments of the present invention.
Figure 9:
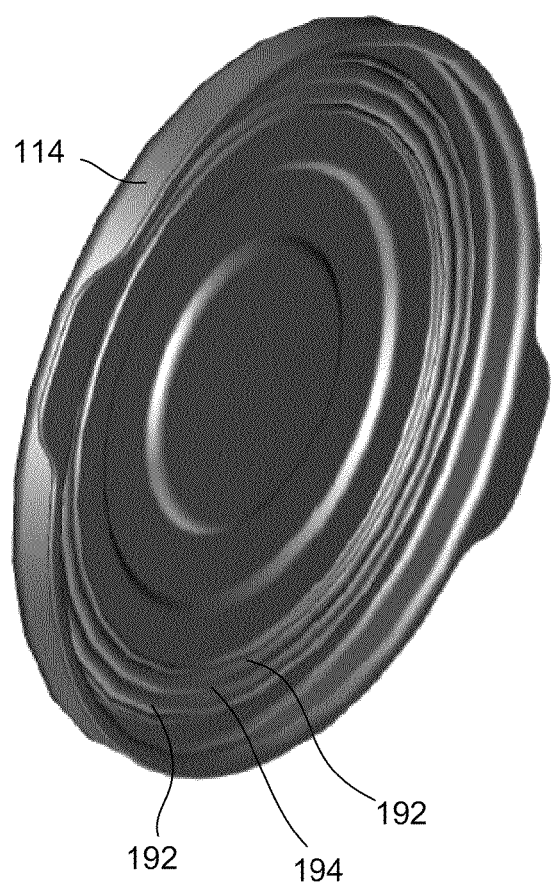
FIG. 9 is a bottom perspective view of a lid, according to embodiments of the present invention.
Figure 10:
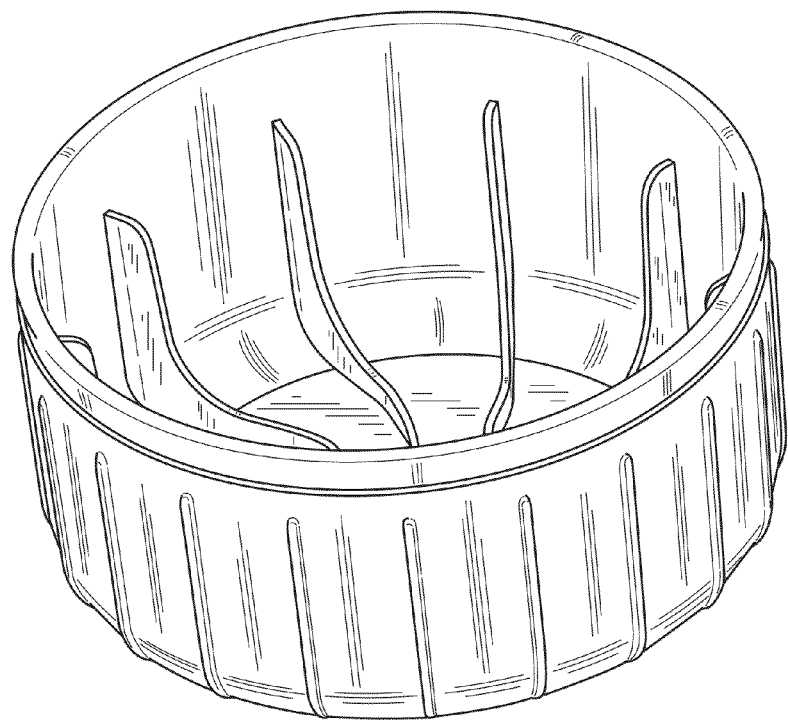
FIG. 10 is a front and top perspective view of a bowl cover, according to embodiments of the present invention.
Figure 11:
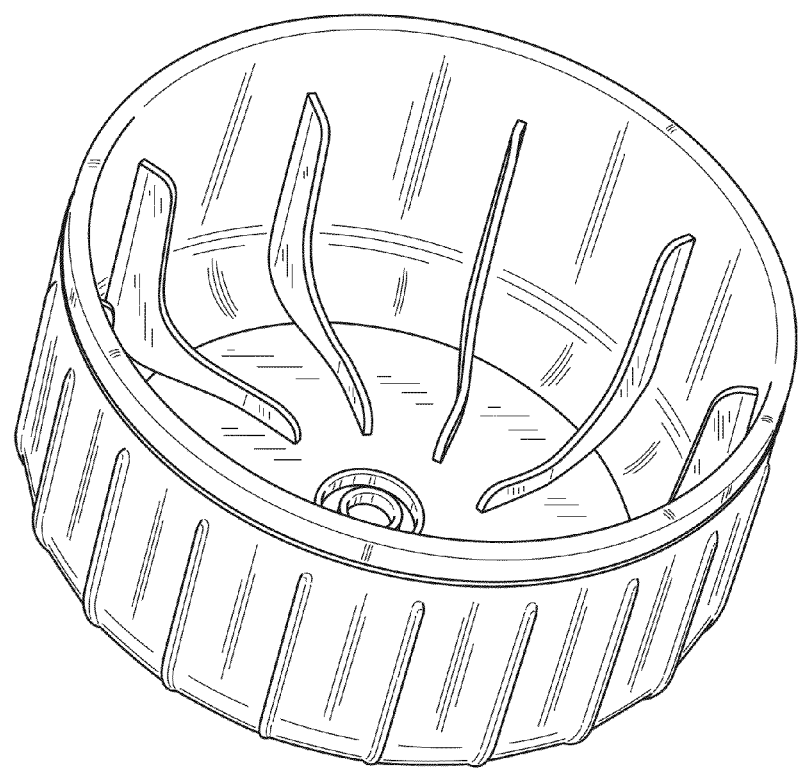
FIG. 11 is a back and top perspective view of the bowl cover of FIG. 10.
Figure 12:
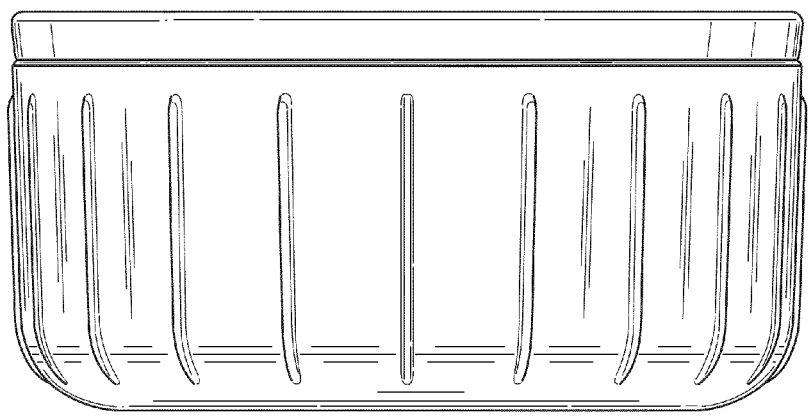
FIG. 12 is a front elevation view of the bowl cover of FIGS. 10 and 11, and the back, left side, and right side elevation views are identical to the front elevation view of FIG. 12, according to embodiments of the present invention.
Figure 13:
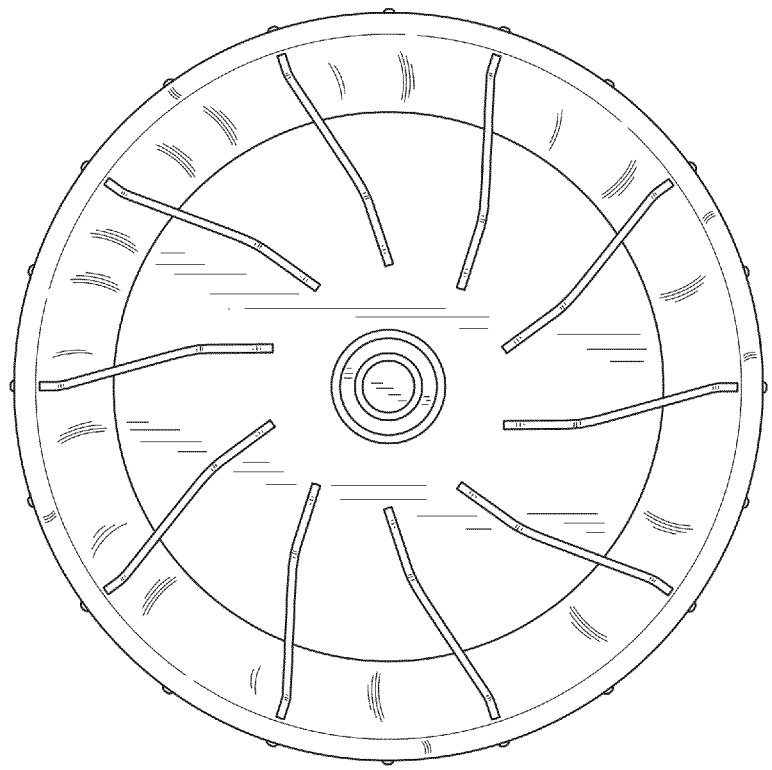
FIG. 13 is a top view of the bowl cover of FIGS. 10-12.
Figure 14:
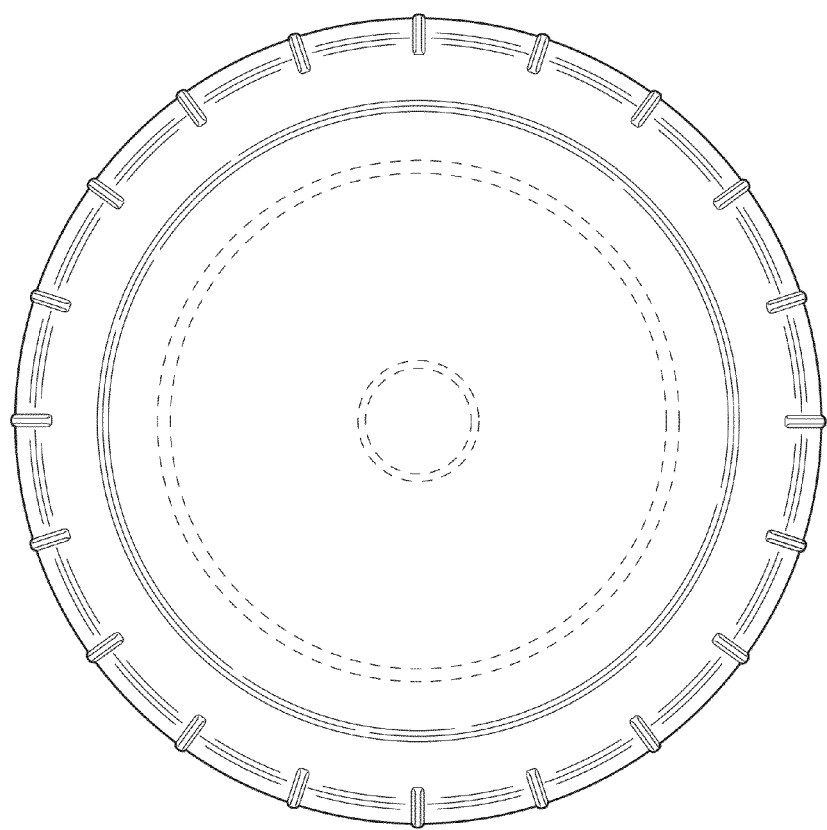
FIG. 14 is a bottom view of the bowl cover of FIGS. 10-13.
Figure 15:
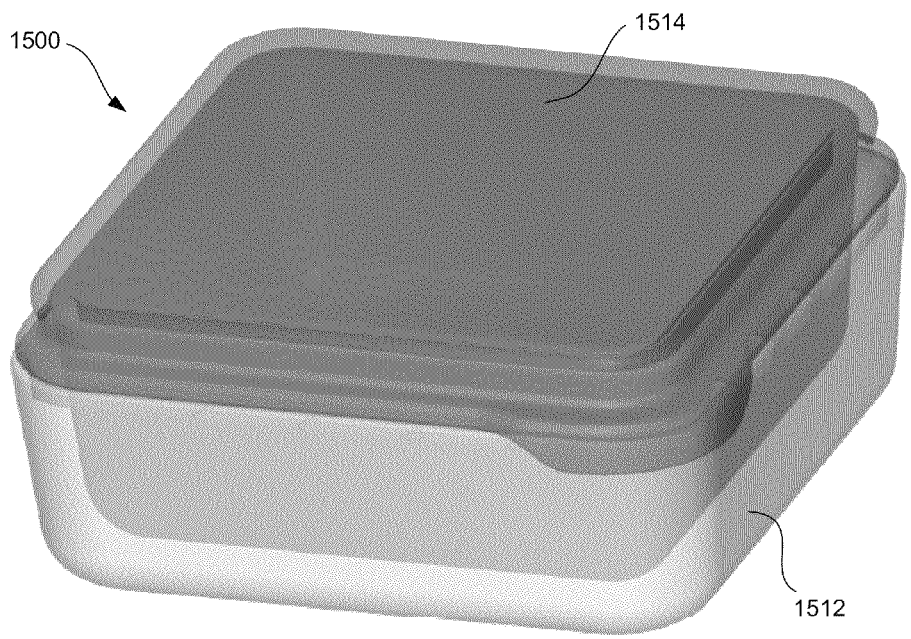
FIG. 15 illustrates a front perspective view of a food storage container, according to embodiments of the present invention.
Figure 16:
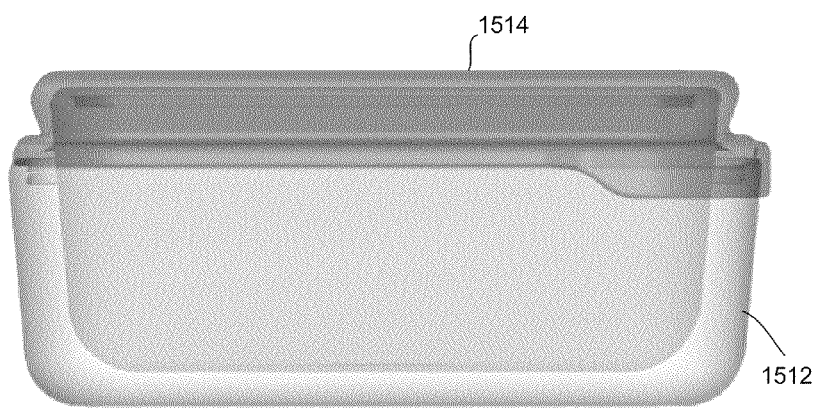
FIG. 16 illustrates a front elevation view of the food storage container of FIG. 15, according to embodiments of the present invention.
Figure 17:
FIG. 17 illustrates a front elevation view of a lid and an inner bowl of the food storage container of FIGS. 15 and 16, according to embodiments of the present invention.
Figure 18:
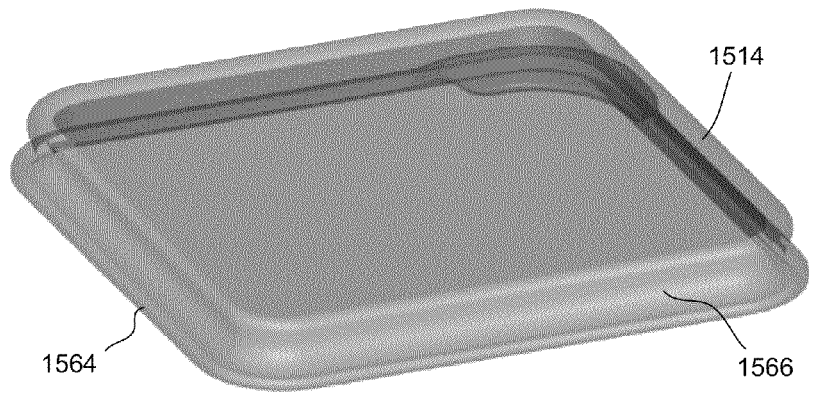
FIG. 18 illustrates a bottom perspective view of the lid of FIGS. 15 to 17, according to embodiments of the present invention.

FIGS. 7-9 illustrate a container system 100 similar in many ways to container 10, according to embodiments of the present invention. Container system 100 includes a bowl cover 112, which may also be referred to as a container or base, and a lid 114, according to embodiments of the present invention. As shown in FIG. 8, the bowl cover 112 may include one or more raised ribs along an inside surface, which are configured to support and a bowl 150, for example a glass bowl, to thermally separate the bowl 150 from the outer surface of the bowl cover 112, and to cushion the bowl 150 if the system 100 is dropped or buffeted. Lid 114 is a "peel off" lid, instead of a "screw-on" lid like lid 14. A lid 114 which can be peeled off of the bowl 150 and base 112 may be easier to use, especially for children with smaller hands and those with disabilities, than a lid 14 which twists, screws, or clicks into place with rotation, according to embodiments of the present invention. One or more tabs 180 included on the lid 114 further facilitate gripping for removal. Lid 114 may be closed onto the bowl cover or base 112 by laying the lid 114 over the base 112 and pushing down onto the lid 114.

The lid 114 may include an annular ring 190 which accommodates a sealing structure on the other side of the lid 114, according to embodiments of the present invention. An example of such a sealing structure is shown in FIG. 9. When the lid 114 is inserted over the bowl 150 and base 112, the lip or rim of the bowl 150 is seated within groove 194, and inner and outer lips 192 extend on both sides of the lip or rim of the bowl 150, with a seal being created as the bowl 150 rim is further seated into the groove 194. At the same time that the bowl 150 rim is being seated in groove 194, the outer flange of the lid 114 may be seated around the upper rim of the bowl cover 112, to provide better thermal properties and as a backup seal to the lip/groove 192/194 seal, according to embodiments of the present invention.

The base or bowl cover 112 may be made of silicone, according to embodiments of the present invention. Silicone provides a comfortable, gel-like texture, which may in some cases be described as sticky, to improve a person's grip on the container system 100 and/or to prevent or discourage sliding of the system 100 with respect to an underlying surface. Silicone also exhibits shock absorbent properties, which improve the cushioning effect of the system 100 with respect to the bowl 150 during a drop or buffet. The lid 114 may also be made out of silicone, according to embodiments of the present invention. According to embodiments of the present invention, the base 112 and/or lid 114 may be made out of an amalgamation or composite of different materials, which may include silicone or be configured to mimic the texture of silicone. Silicone and its derivatives also have desirable thermal properties, such that if the system 100 is microwaved, the base 112 and/or lid 114 are able to be handled even if the bowl 150 has become too hot to touch, according to embodiments of the present invention.

FIGS. 15 to 20 illustrate an alternative embodiment of a food storage container system 1500, according to embodiments of the present invention. The container includes a lid 1514 and a bowl cover 1512, and a bowl 1550. The food storage container system 1500 operates in much the same fashion, and has characteristics similar to, food storage containers 10 and 100, according to embodiments of the present invention. Lid 1514 includes an inner perimeter surface 1566 which is shaped and configured to fit snugly over the inner bowl 1550 and to rest against a top outer surface of the inner bowl 1550, according to embodiments of the present invention. The inner bowl 1550 may be glass, Pyrex®, and/or the like, while the lid 1514 and/or bowl cover 1512 may be silicone, according to embodiments of the present invention. The bottom edge 1564 of the lid 1514 is configured to rest against or otherwise engage with the top edge 1525 of the bowl cover 1512 while the lid 1514 also snugly fits over the inner bowl 1550, according to embodiments of the present invention. The lid 1514 may also include a tab or overhang 1580 which makes it easier for a user to grip and/or peel away and/or remove the lid 1514 from the inner bowl 1550 and/or the bowl cover 1512, according to embodiments of the present invention.

The bowl cover 1512 may be formed integrally as a single piece by an injection molding process, for example. The bowl cover 1512 includes a plurality of ribs 1522 protruding on the inside of the bowl cover 1512. The plurality of ribs 1522 may each extend from the bottom 1598 of the bowl cover 1512 upwardly toward the upper edge 1525, for example ribs 1522 may extend a majority of the height, or about three fourths of the height, or the entire height, between the bottom 1598 and the top edge 1525, according to embodiments of the present invention. From the top view (see FIG. 19), a number of ribs 1522 may protrude from each of the four inner walls 1524 of the bowl cover 1512, and each of the ribs may be angled with respect to the inner walls 1524 from which they protrude. The ribs 1522 may have a substantially uniform angle with respect to the side walls 1524 along all or most of their height (with height being measured in a direction from a bottom 1598 of the bowl cover 1512 to a top edge 1525 of the bowl cover 1512), according to embodiments of the present invention. In other words, the ribs 1522 in some embodiments do not extend from the inside walls 1524 at a perpendicular angle; according to some embodiments of the present invention, each of the ribs 1522 extending from the same wall 1524 extends from the wall 1524 at the same angle. As illustrated in the top view of FIG. 19, this angle may be 70 degrees, for example. According to other embodiments, this angle is between 60 and 80 degrees, and according to yet other embodiments, this angle is between 50 and 90 degrees. According to some embodiments of the present invention, the ribs 1522 extend from the inner surface of the bowl cover 1512 in a manner exhibiting rotational symmetry, for example rotational symmetry of order four (due to the square cross sectional shape); in other words, from the top view of FIG. 19, the bowl cover 1512 may be rotated about the center through four different positions and have the same visual appearance in each position.

Figure 19:
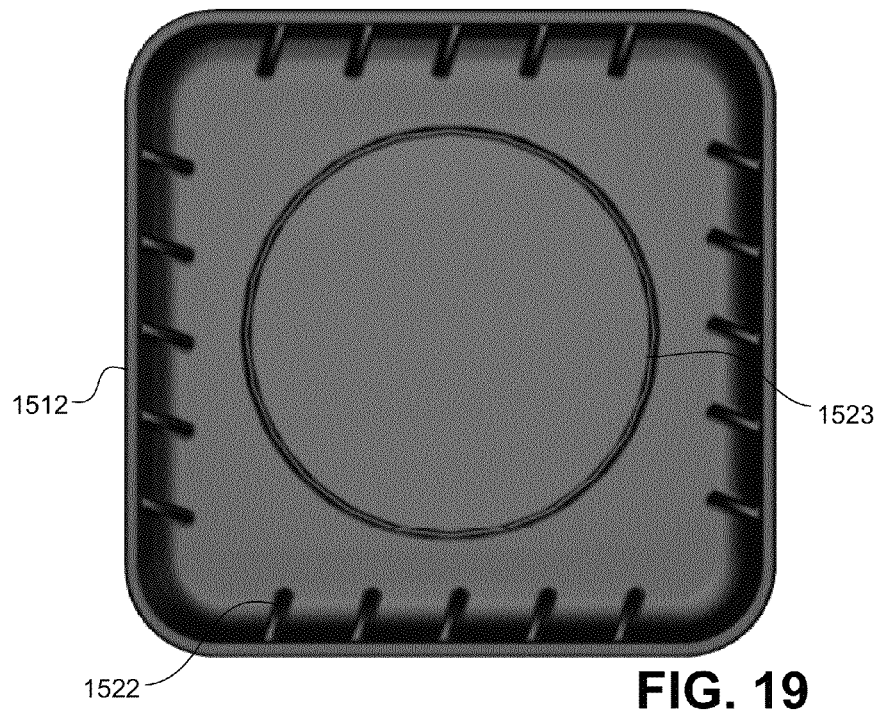
FIG. 19 illustrates a top plan view of the bowl cover of FIGS. 15 and 16, according to embodiments of the present invention.
Figure 20:
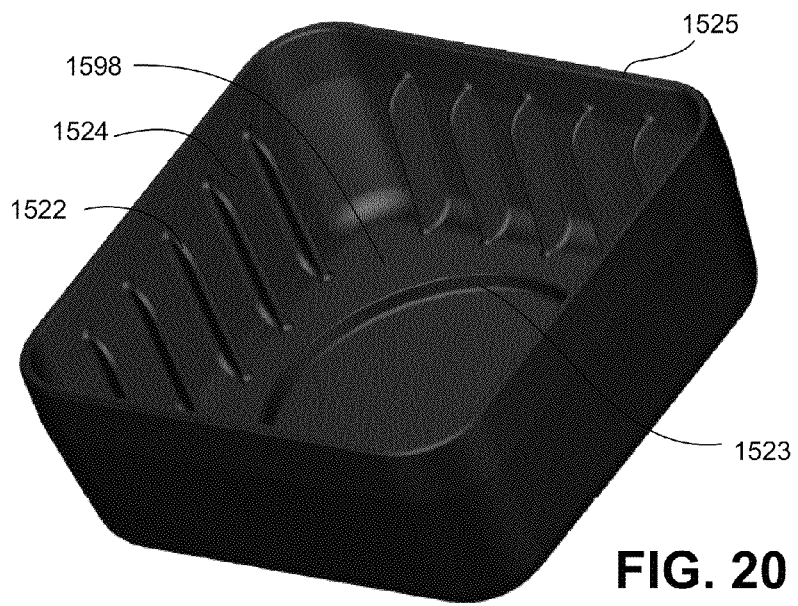
FIG. 20 illustrates a front and top perspective view of the bowl cover of FIGS. 15, 16, and 19, according to embodiments of the present invention.

The bottom 1598 may also include a raised lip 1523, which may be in the form of a circle as illustrated in FIGS. 19 and 20, according to embodiments of the present invention. The raised lip 1523 and the ribs 1522 serve to insulate the inner bowl 1550 from the bowl cover 1512, and also to separate the inner bowl 1550 from the bowl cover 1512 to better cushion any impacts experienced by the bowl cover 1512. The raised lip 1523 may also hold the glass inner bowl 1550 by vacuum against the bottom 1598 of the bowl cover 1512, to ensure that the glass bowl 1550 remains in place against the bottom 1598 even when both are upside down, according to embodiments of the present invention. The raised lip 1523 may be seventy millimeters in diameter, according to embodiments of the present invention.

Figure 21:
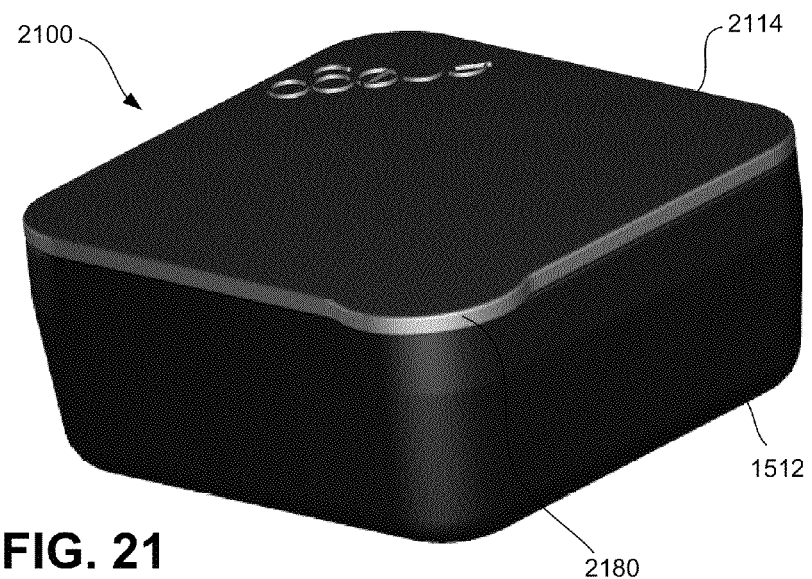
FIG. 21 illustrates a front perspective view of a food storage container, according to embodiments of the present invention.
Figure 22:
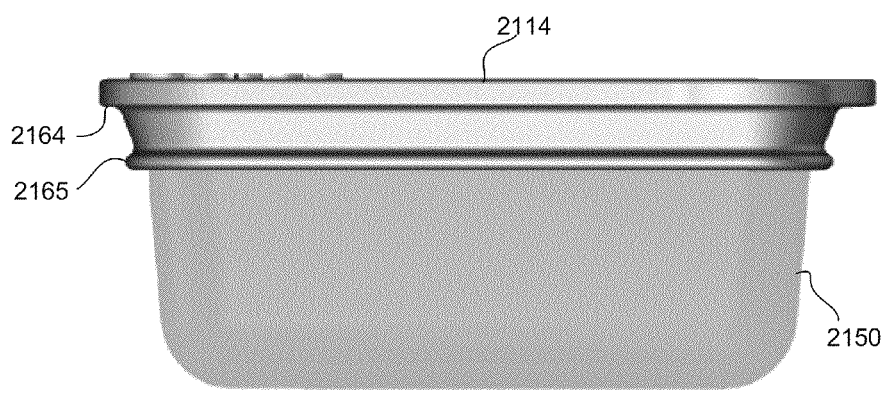
FIG. 22 illustrates a front elevation view of the lid and inner bowl of the food storage container of FIG. 21, according to embodiments of the present invention.
Figure 23:
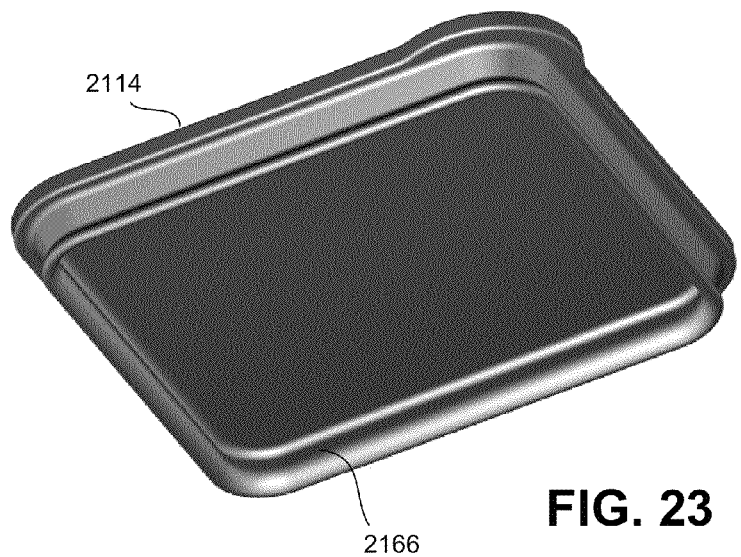
FIG. 23 illustrates a bottom perspective view of the lid of FIGS. 21 and 22, according to embodiments of the present invention.
Figure 24:
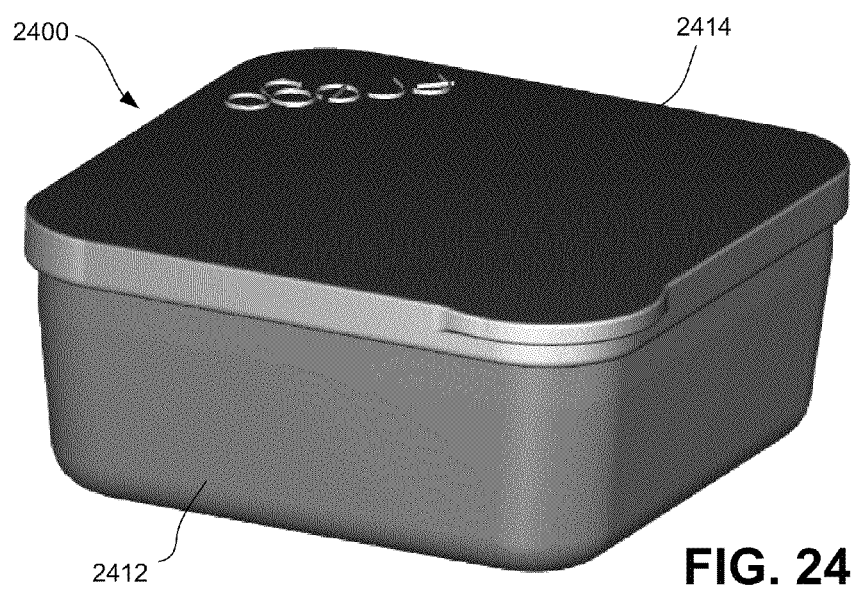
FIG. 24 illustrates a front perspective view of a food storage container, according to embodiments of the present invention.
Figure 25:
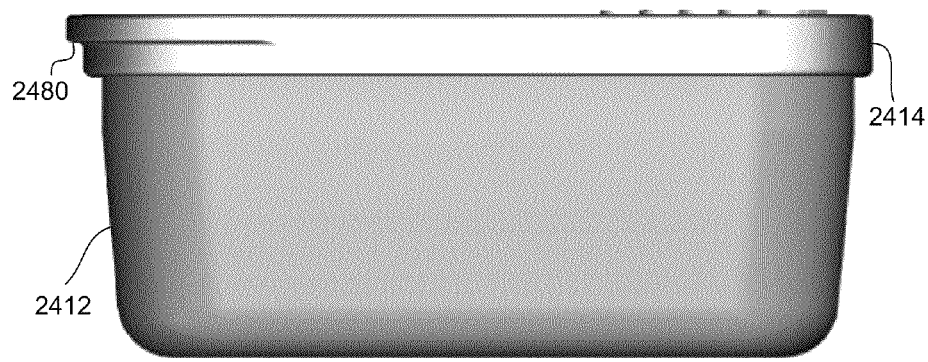
FIG. 25 illustrates a front elevation view of the food storage container of FIG. 24, according to embodiments of the present invention.
Figure 26:
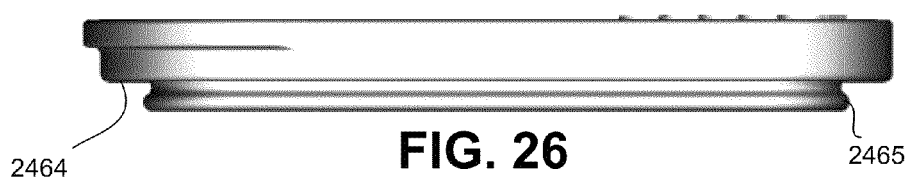
FIG. 26 illustrates a front elevation view of the lid of the food storage container of FIGS. 24 and 25, according to embodiments of the present invention.
Figure 27:
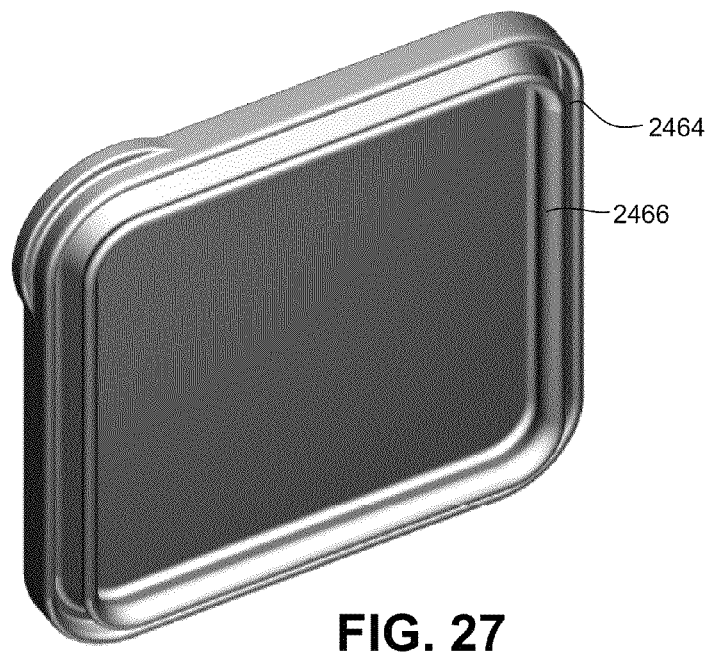
FIG. 27 illustrates a bottom perspective view of the lid of FIGS. 24 to 26, according to embodiments of the present invention.
Figure 28:
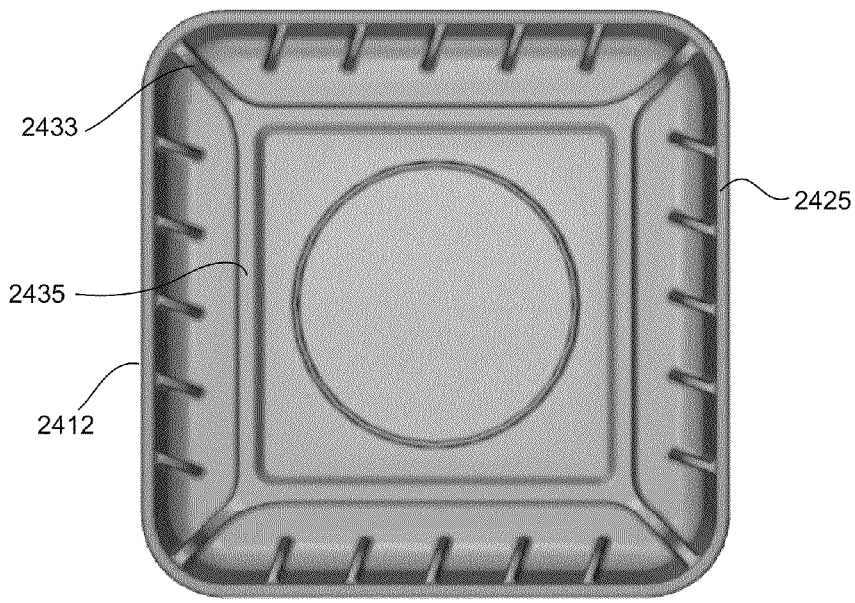
FIG. 28 illustrates a top plan view of the bowl cover of the food storage container of FIGS. 24 and 25, according to embodiments of the present invention.
Figure 29:
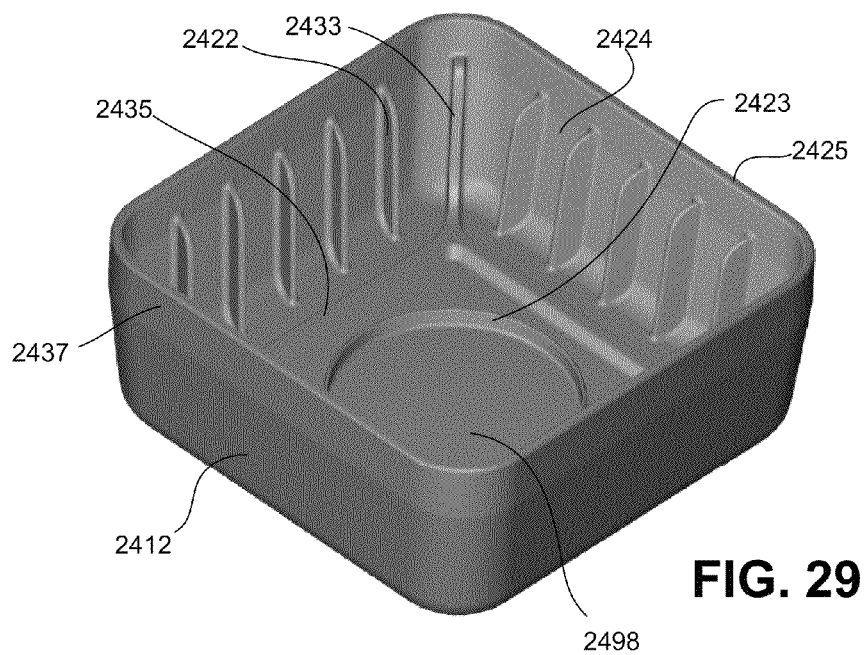
FIG. 29 illustrates a top perspective view of the bowl cover of FIG. 28, according to embodiments of the present invention.

FIGS. 21 to 23 illustrate a food storage container system 2100 similar to system 1500, with a different lid 2114, according to embodiments of the present invention. Food storage container system 2100 includes lid 2114, bowl cover 2112, and inner bowl 2150, according to embodiments of the present invention. Lid 2114 includes an inner perimeter surface 2166 configured to engage with and seal around a top outer perimeter of inner bowl 2150, according to embodiments of the present invention. Lid 2114 also includes a lower surface 2164 configured to rest against or otherwise engage with the top edge 1525 of bowl cover 1512 while inner perimeter surface 2166 is engaged with the top outer perimeter of the inner bowl 2150, according to embodiments of the present invention. Lid 2114 further includes a lower perimeter lip 2165 configured to improve the seal or closure between the lid 2114 and the bowl cover 1512 when the lid 2114 is secured to bowl cover 1512 and inner bowl 2150, according to embodiments of the present invention.

FIGS. 24 to 29 illustrates a food storage container system 2400 similar to systems 1500 and 2100, but with a different lid 2414 and a different bowl cover 2412, according to embodiments of the present invention. Lid 2414 includes an outer lip 2464 configured to engage with or form a seal with an outer surface 2437 of the upper opening perimeter 2425 of the bowl cover 2412, according to embodiments of the present invention. Lid 2414 also includes an inner lip 2466 configured to engage with or form a seal with an outer surface of inner bowl 2150, according to embodiments of the present invention. Lid 2414 further includes a lower perimeter lip 2465 formed on the inner lip 2466 and configured to improve the sealing between the inner lip 2466 and the bowl cover 2412, according to embodiments of the present invention.

Because the lid 2414 is configured to cover and seal around an outside of the bowl cover 2412 in which has been placed an inner bowl such as inner bowl 2150, the bowl cover 2412 may be provided with features to discourage the sides 2424 from bulging outwardly too far upon insertion of the inner bowl 2150, according to embodiments of the present invention. For example, the bowl cover 2412 may be similar to bowl cover 1512, with the addition of reinforcement ribs 2433 to each inside corner and a reinforcement base 2435, which is shown in the shape of a square but which may take other shapes, to the bottom 2498 of the inside of the bowl cover 2412. Reinforcement ribs 2433 and/or reinforcement base 2435 further stiffen the bowl cover 2412 and discourage warping or bulging out of the sides 2424 upon insertion of the inner bowl 2150, according to embodiments of the present invention. Otherwise, the ribs 2422 are similar to ribs 1522 described above, and the bottom lip 2423 is similar to bottom lip 1523 described above, according to embodiments of the present invention. Lid 2414 may also include a feature 2480 to facilitate gripping and removal of the lid 2414, according to embodiments of the present invention.

Although bowl covers and lids are described herein as being used with a glass inner bowl with a single compartment, the glass inner bowl may also include two or more inner compartments. Also, the shapes of the lids and the bowl covers described herein may be formed to permit the easy stacking of multiple container systems, for example by forming an indentation in the lid which corresponds to a shape of the bottom of the bowl cover or the bottom of the inner glass bowl, according to embodiments of the present invention. Although containers systems described herein may be used to heat foods in a microwave oven, they may also be used to heat foods in a conventional oven, and the same container system may be used in either or both, according to embodiments of the present invention.

According to embodiments of the present invention, the lid of the container system may include a ventilation hole to let air out of the container, in order to reduce the possibility of excessive moisture (in order to reduce the chance of molding) and over-steaming. Container systems may be used for storage, heating, and transporting foods, and may be manufactured in different shapes, sizes, and/or colors or color combinations.

Although embodiments of the bowl cover are described as having one or more fins or ribs separating the bowl cover from the inner glass bowl, according to some embodiments of the present invention, these inner ribs are not present. According to such embodiments, a silicone sleeve may be placed directly over the inner glass bowl, with a large (or entire) surface area of contact between the outer surface of the bowl and the inner surface of the bowl cover. Such embodiments may include a very small or an almost imperceptible air gap between the inner bowl and the bowl cover.

Some embodiments of the present invention may include one or more of the following features and/or characteristics:
  resistance to breaking
  extremely heat-resistant
  non-slip outer surfaces
  minimization of chemical transfer (because glass and silicone are physiologically inert)
  reduction in microwaving and/or cooking time
  elimination of hot/cold spots in heated food via suspension of the glass bowl
  ease of gripping (to reduce risk of dropping or mishandling)
  free from staining or odors
  highly resistant to thermal expansion (e.g. upon transfer from a refrigeration system to a pre-heated oven).
  use for steaming of foods (e.g. by putting water in the outer (e.g. silicone) bowl before placing the glass bowl inside, with steam rising from the channels created by the ribs around the outside of the glass)
  vent in the lid to permit escape of steam or moisture or other gases
  inner glass bowl is held to the outer bowl cover by the ring (e.g. the 70 mm diameter ring) on the bottom inside of the outer bowl cover, to help ensure that the glass remains in place even when upside down
  the lid (e.g. the silicone lid) is completely independent of the bowl cover (e.g. the silicone bowl cover) and either can be in use without the other.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A food storage container comprising:
  a polymeric outer container defining an inner surface;
  a plurality of shock-absorbing ribs disposed on the inner surface, the plurality of shock-absorbing ribs spaced apart along the inner surface of the polymeric outer container;
  a glass container configured for placement on the plurality of shock-absorbing ribs, the glass container including an upper rim; and
  a polymeric cover including at least one sealing lip that sealingly engages the upper rim in an air- and water-tight manner.

2. The food storage container of claim 1, wherein the polymeric outer container includes a non-slip bottom surface.

3. The food storage container of claim 2, wherein the non-slip bottom surface comprises silicone.

4. The food storage container of claim 1, wherein the polymeric outer container includes a non-slip handling surface.

5. The food storage container of claim 1, wherein the polymeric outer container and the polymeric cover are formed of molded silicone.

6. The food storage container of claim 1, wherein the upper rim is a first upper rim, wherein the polymeric outer container comprises a second upper rim, and wherein the polymeric cover engages the second upper rim while the at least one sealing lip sealingly engages the first upper rim.

7. The food storage container of claim 1, wherein the at least one sealing lip sealingly engages an outer surface of the upper rim.

8. The food storage container of claim 7, wherein the upper rim is a first upper rim, wherein the polymeric outer container comprises a second upper rim, and wherein the polymeric cover sealingly engages the second upper rim while the at least one sealing lip sealingly engages the first upper rim.

9. The food storage container of claim 8, wherein the polymeric cover sealingly engages an outer surface of the second upper rim while the at least one sealing lip sealingly engages the first upper rim.

10. The food storage container of claim 1, wherein the polymeric outer container and the polymeric cover have a substantially circular cross sectional shape.

11. The food storage container of claim 10, wherein each of the plurality of shock-absorbing ribs extends from a bottom inner surface and a side inner surface of the polymeric outer container.

12. The food storage container of claim 1, wherein the polymeric outer container and the polymeric cover have a substantially rectangular or square cross sectional shape.

13. The food storage container of claim 12, wherein each of the plurality of shock-absorbing ribs extends from a side inner surface of the polymeric outer container, and wherein the polymeric outer container further comprises a raised lip formed on a bottom inner surface of the polymeric outer container.

14. The food storage container of claim 13, further comprising a reinforcing rib structure formed at each corner of the side inner surface and extending to the bottom inner surface.

15. The food storage container of claim 1, wherein each of the plurality of shock-absorbing ribs extends from the inner surface at an angle with respect to the inner surface.

16. The food storage container of claim 15, wherein the plurality of shock-absorbing ribs extend from the inner surface in a rotationally symmetrical manner.

17. A bowl cover comprising:
a bottom formed of silicone;
a side wall formed of silicone as one piece with the bottom, the side wall and the bottom configured to receive and encircle an inner bowl formed of glass;
a plurality of ribs extending from an inside of the side wall in a rotationally symmetric manner, the plurality of ribs configured to contact the inner bowl to insulate and isolate the inner bowl from at least the side wall, wherein the plurality of ribs is flexible so as to be shock absorbent,
wherein each of the plurality of ribs extends from at least the side wall at a non-perpendicular angle with respect to the side wall.

18. The bowl cover of claim 17, wherein the plurality of ribs extends from at least the side wall in a rotationally symmetrical manner of order four, five, six, seven, eight, nine, ten, eleven, or twelve.

19. A bowl cover comprising:
an inner bowl formed of glass, the inner bowl having an upper rim;
a bottom formed of silicone;
a side wall formed of silicone as one piece with the bottom, the side wall and the bottom configured to receive and encircle the inner bowl; and
a polymeric cover including at least one sealing lip that sealingly engages the upper rim in an air- and water-tight manner.

20. The bowl cover of claim 19, wherein the inner bowl has a substantially rectangular cross-sectional shape.

21. The bowl cover of claim 20, wherein the inner bowl has a substantially square cross-sectional shape.

22. The bowl cover of claim 1, wherein the polymeric cover comprises a vent to permit escape of gases.

23. The bowl cover of claim 19, wherein the polymeric cover comprises a vent to permit escape of gases.

* * * * *